(12) United States Patent
Lee et al.

(10) Patent No.: US 8,006,085 B2
(45) Date of Patent: Aug. 23, 2011

(54) LICENSE MANAGEMENT SYSTEM AND METHOD

(75) Inventors: Jae-Won Lee, Yongin-si (KR); Hee-Youl Kim, Yongin-si (KR); Hyun-Soo Yoon, Daejeon (KR); Byung-Chun Chung, Daejeon (KR); Youn-Ho Lee, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 544 days.

(21) Appl. No.: 12/166,701

(22) Filed: Jul. 2, 2008

(65) Prior Publication Data

US 2009/0013177 A1 Jan. 8, 2009

(30) Foreign Application Priority Data

Jul. 3, 2007 (KR) ........................ 10-2007-0066609

(51) Int. Cl.
*H04L 9/00* (2006.01)
(52) U.S. Cl. ......... 713/158; 713/168; 713/173; 713/175
(58) Field of Classification Search .................. 713/150, 713/155–158, 168, 173, 175; 726/1–6, 10
See application file for complete search history.

(56) References Cited

U.S. PATENT DOCUMENTS 7,418,597 B2* 8/2008 Thornton et al. ............. 713/175

FOREIGN PATENT DOCUMENTS

| JP | 2005242543 A | 9/2005 |
| KR | 102004105684 A | 12/2004 |
| KR | 1020050101940 A | 10/2005 |
| KR | 102006122676 A | 11/2006 |

* cited by examiner

*Primary Examiner* — Hosuk Song
(74) *Attorney, Agent, or Firm* — Sughrue Mion, PLLC (57) ABSTRACT

A license-management system and method is provided. A method of issuing a proxy certificate includes transmitting a proxy-certificate-issuance-request message to a license server in order for the local license manager to acquire an authority to issue a license by a local license manager; enabling the license server to verify the proxy-certificate-issuance-request message; if the proxy-certificate-issuance-request message is valid, transmitting a proxy certificate to the local license manager by the license server, the proxy certificate including information regarding the authority to issue a license; and verifying the proxy certificate by the local license manager.

15 Claims, 12 Drawing Sheets

| PROXY-CERTIFICATE-ISSUANCE-REQUEST MESSAGE (400) |
|---|
| SUBJECT: LLM<br><br>PROXY PUBLIC KEY: PK_Proxy<br><br>RULES REGARDING GENERATION OF PROXY |
| SIG_Proxy (402) |
| SIG_LLM (404) |

FIG. 5

PROXY CERTIFICATE (500)

RIGHTS ISSUER: LS

SUBJECT: LLM

SERIAL NUMBER: 0000001234

PROXY PUBLIC KEY: PK_Proxy

VALIDITY PERIOD: 06.09.01 ~ 06.09.30

PROXY CERTIFICATE INFORMATION

SIG_LS (502)

PROXY-CERTIFICATE-RENEWAL-REQUEST MESSAGE (700)

SUBJECT: LLM

SERIAL NUMBER: 0000001234

⋮

SIG_LLM (404-1)

LICENSE MANAGEMENT SYSTEM AND METHOD

CROSS-REFERENCE TO RELATED APPLICATION

This application claims priority from Korean Patent Application No. 10-2007-0066609 filed on Jul. 3, 2007 in the Korean Intellectual Property Office, the disclosure of which is incorporated herein by reference in its entirety.

BACKGROUND OF THE INVENTION

1. Field of the Invention

The present invention relates to a license-management system and method, and more particularly, to a license-management system and method in which access to digital content can be controlled in various manners and a license for the use of digital content can be effectively managed.

2. Description of the Related Art

Digital Rights Management (DRM) is basically for enabling the use of content by a user who has legitimately purchased the content. Initial DRM systems have been designed to allow only a device authorized to access content purchased by the user access the content. However, recent developments in home appliance technology and the advent of ubiquitous environments have raised the necessity of allowing a user to use content with more than one device.

In order to meet this necessity, authorized domains (AD) have been developed. The concept of ADs is characterized by allowing devices belonging to an AD to share content with each other without any restrictions while imposing restrictions on the use of content by devices not belonging to the AD. DRM systems which support ADs include Thomson's SmartRight systems, Open Mobile Alliance (OMA) DRM systems, and IBM's xCP systems.

Figure 1:
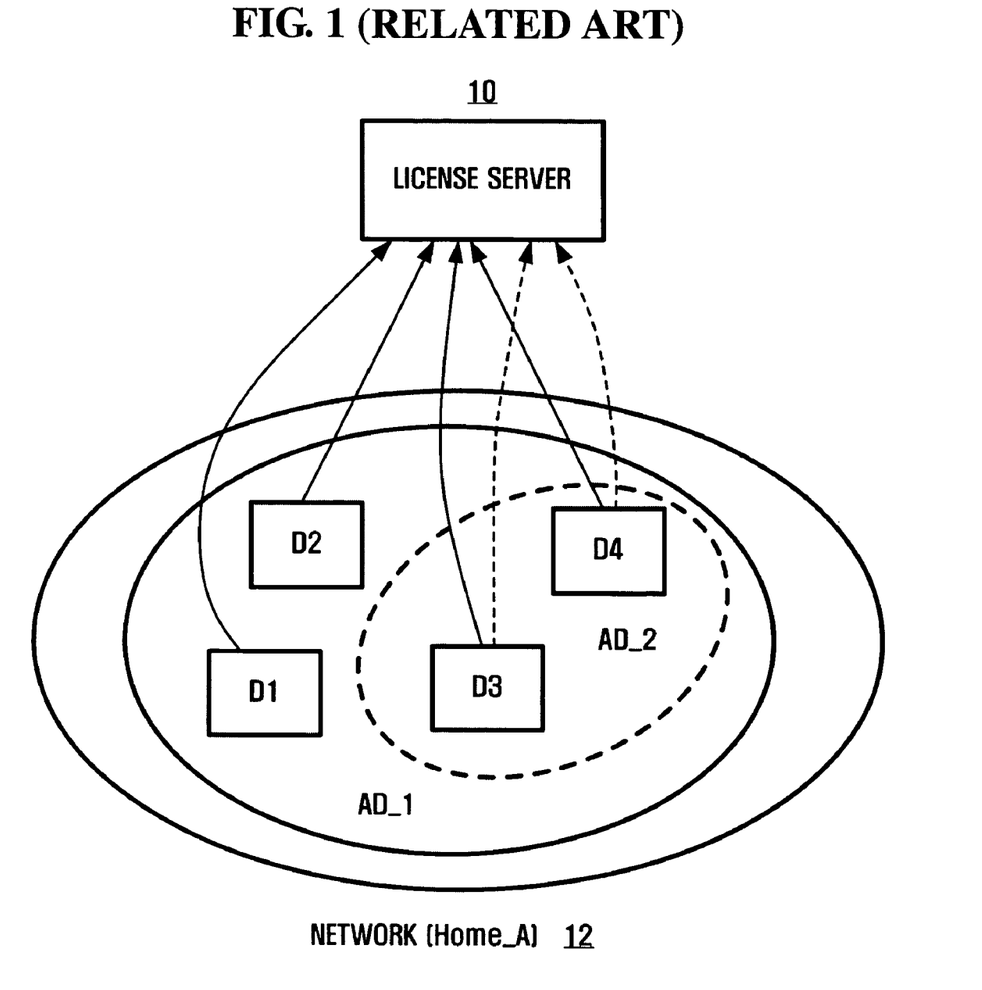
FIGS. 1 and 2 illustrate related art methods of configuring a network with a plurality of devices.

In the case of the OMA DRM system and the xCP system, a central license server directly manages all domains, as illustrated in FIG. 1. That is, in order for a device to enter a predetermined domain, the device needs to negotiate with a central license server. If the device is allowed to enter the predetermined domain, the device may acquire a domain key to the predetermined domain from the central license server. This is described in detail below.

FIGS. 1 and 2 illustrate related art methods of configuring a network with a plurality of devices.

Specifically, FIG. 1 illustrates the situation when four devices D1, D2, D3, and D4 constitute a network Home_A (12). The network Home_A (12) configures two domains AD_1 and AD_2. The domain AD_1 includes all the devices D1, D2, D3, and D4 in the network Home_A (12), and a domain key DK_1 is shared within the domain AD_1. The domain AD_2 only includes the devices D3 and D4, and a domain key DK_2 is shared within the domain AD_2. The domains AD_1 and AD_2 are differentiated from each other in order to appropriately control access to content according to the purpose of use of the content.

The SmartRight system, unlike the OMA DRM system or the xCP system, can configure its own ADs for a number of devices without the aid of a license server 10.

Figure 2:
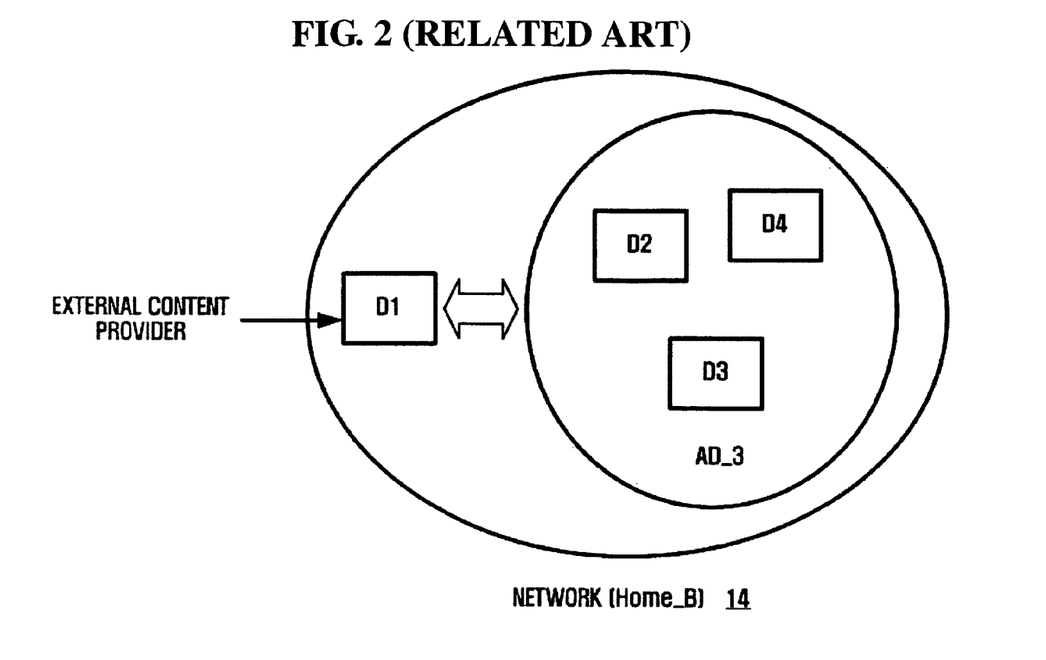

FIG. 2 illustrates the situation when devices D1, D2, D3, and D4 constitute a network Home_B (14). The network Home_B (14) configures only one domain AD_3 which is constituted by the devices D2, D3, and D4, and a domain key DK_3 is shared within the domain AD_3. The device D1 receives from an external content provider encrypted content which can only be decrypted by the device D1, repackages the content with a license and then provides the content to the devices D2, D3, and D4 in the domain AD_3 so that the content can be reproduced by the devices D2, D3, and D4 in the domain AD_3. Since the device D1 does not know of the domain key DK_3, the device D1 needs help from devices D2, D3, and D4 in the domain AD_3.

An AD-management method of a related art DRM system has the following problems.

From the perspective of domain management, related art domain management methods (such as those of OMA DRM systems or xCP systems), which are generally characterized by a central license server that manages all domains, may result in management overload for a central license server. From the perspective of users, related art domain-management methods may cause problems of privacy violation by allowing a central license server to have all the information regarding devices belonging to a user domain.

From the perspective of content management, related art domain management methods have difficulty flexibly controlling access to content because they involve binding a domain with a single domain key. To address this problem, OMA DRM systems or xCP systems have been designed to allow more than one AD to be provided for a single network. However, it is still difficult for OMA DRM systems or xCP systems to provide sophisticated ways of controlling access to content while reducing the load of central license servers. In addition, SmartRight systems do not provide any functions regarding the control of access to content by individual devices.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Aspects of the present invention provide a license-management system and method in which access to digital content can be controlled in various manners and a license for the use of digital content can be effectively managed.

However, the aspects of the present invention are not restricted to the one set forth herein. The above and other aspects of the present invention will become apparent to one of daily skill in the art to which the present invention pertains by referencing the detailed description of the present invention given below.

According to an aspect of the present invention, there is provided a method of issuing a proxy certificate, the method including: transmitting a proxy-certificate-issuance-request message by a local license manager to a license server in order for the local license manager to acquire an authority to issue a license; verifying the proxy-certificate-issuance-request message by a license server; if the proxy-certificate-issuance-request message is valid, transmitting a proxy certificate to the local license manager by the license server, the proxy certificate including information regarding the authority to issue a license; and verifying the proxy certificate by the local license manger.

According to another aspect of the present invention, there is provided a method of renewing a proxy certificate, the method including: transmitting a proxy-certificate-renewal-request message by a local license manager to a license server, the proxy-certificate-renewal-request message including information regarding an authority to issue a license; verifying the proxy-certificate-renewal-request message by the license server; if the proxy-certificate-renewal-request message is valid, inquiring an Online Certificate Status Protocol (OCSP) server whether an existing proxy certificate held by the local license manager is valid by the license server; and if a response message indicating that the existing proxy certificate is valid is received from the OCSP server, transmitting a new proxy certificate to the local license manager by the license server.

According to another aspect of the present invention, there is provided a method of verifying a proxy certificate, the method including: transmitting a proxy-certificate-verification-request message by a device to a local license manager; transmitting the proxy-certificate-verification-request message to an OCSP server by the local license manger; transmitting a response message indicating the result of verification of a proxy certificate by the OCSP server to the local license manager; and transmitting the response message to the device by the local license manager.

According to another aspect of the present invention, there is provided a local license manager including: a first generation module which generates at least one of a first request message for requesting a proxy certificate including information regarding an authority to issue a license and a second request message for requesting a proxy certificate to be renewed; and a first verification module which receives at least one of a first proxy certificate from a license server and verifies the first proxy certificate and a second proxy certificate from the license server in response to the second request message and verifies the second proxy certificate.

According to another aspect of the present invention, there is provided a license server including: a second verification module which receives at least one of a first request message for requesting a proxy certificate including information regarding an authority to issue a license and a second request message for requesting a proxy certificate to be renewed from a local license manager and verifies the first or second request message; and a second generation module which generates at least one of a first proxy certificate if the first request message is valid and a second proxy certificate if the second request message is valid.

BRIEF DESCRIPTION OF THE DRAWINGS

The above and other aspects and features of the present invention will become apparent by describing in detail exemplary embodiments thereof with reference to the attached drawings, in which.

DETAILED DESCRIPTION OF EXEMPLARY EMBODIMENT OF THE INVENTION

The present invention will now be described more fully with reference to the accompanying drawings, in which exemplary embodiments of the invention are shown.

Figure 3:
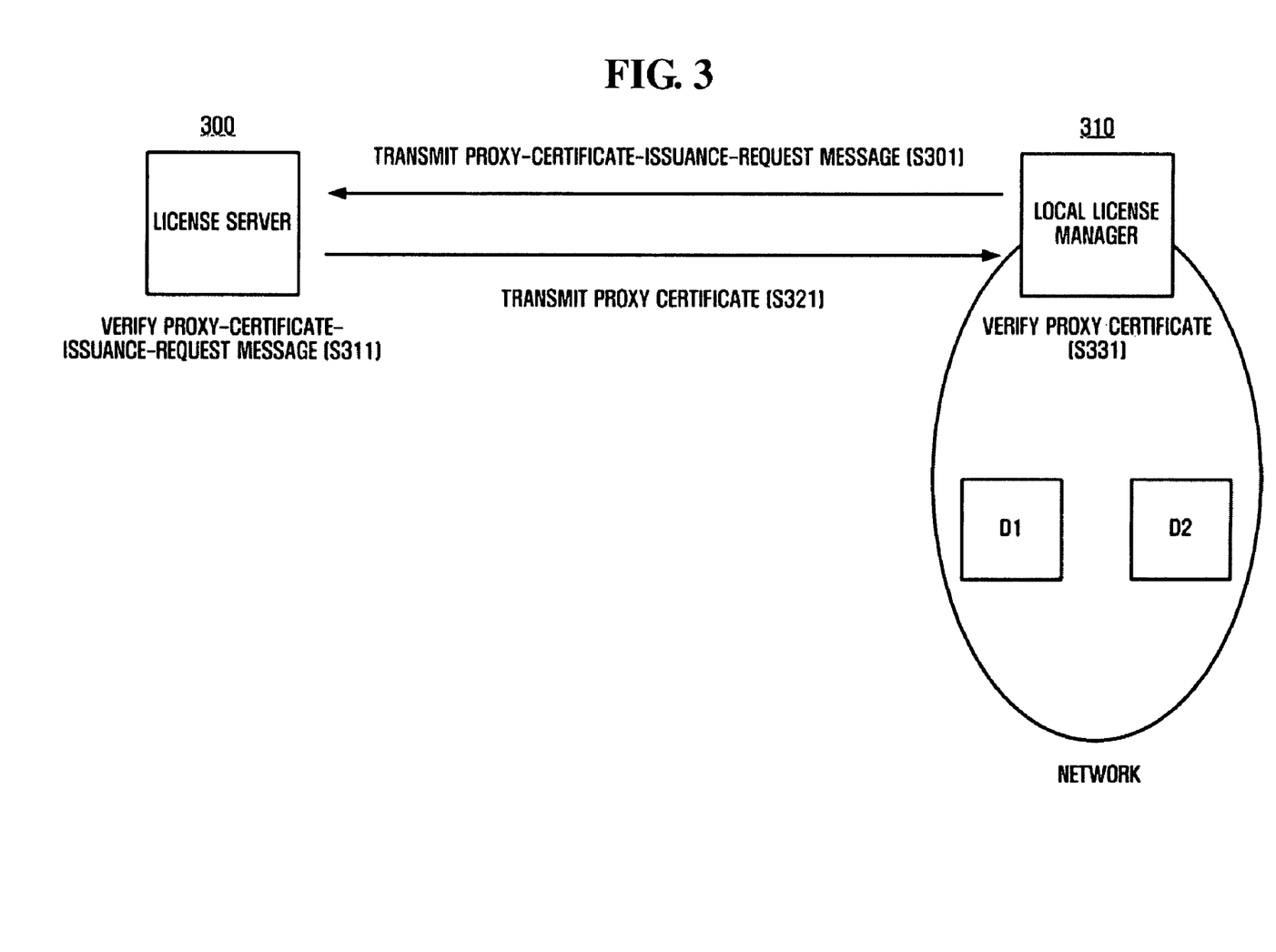
FIG. 3 illustrates the delegation of the authority to issue a license to a local license manager by a license server according to an exemplary embodiment of the present invention.
Figure 4:
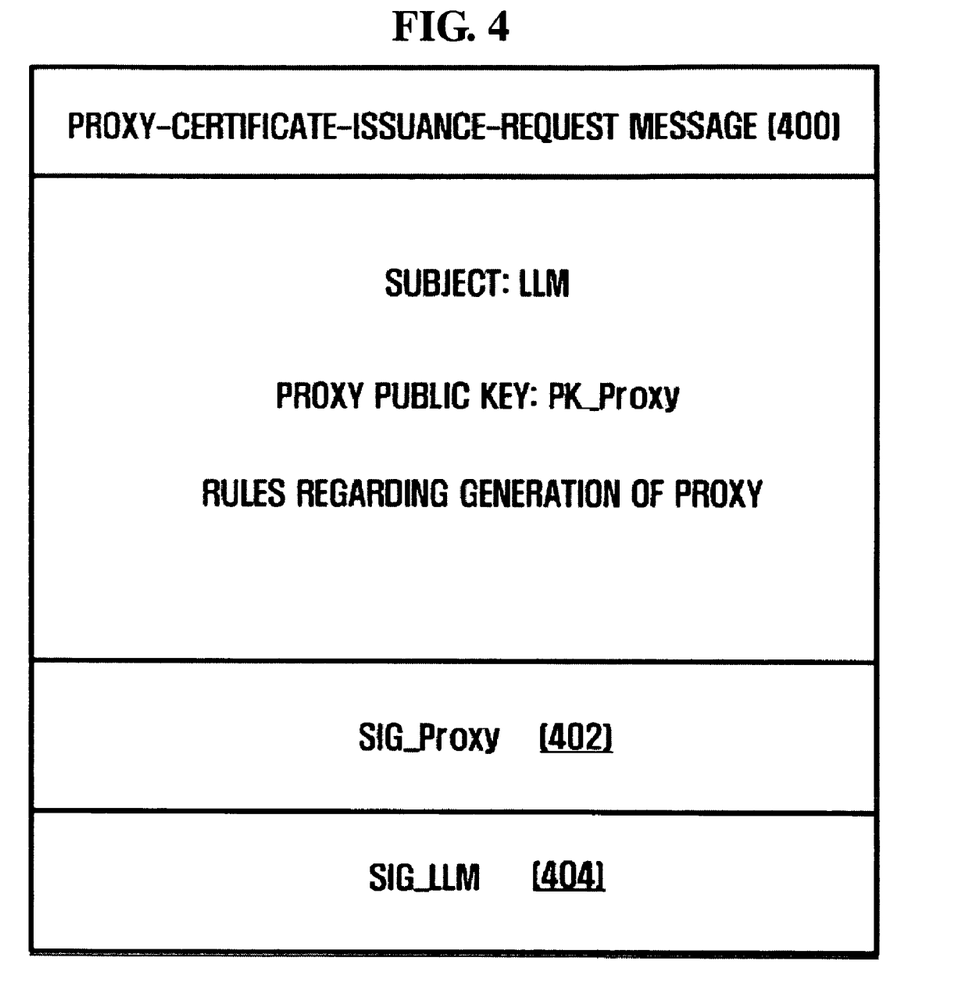
FIG. 4 illustrates a proxy-certificate-issuance-request message according to an exemplary embodiment of the present invention.

FIG. 3 illustrates the delegation of the authority to issue a license to a local license manager (LLM) 310 by a license server (LS) 300, according to an exemplary embodiment of the present invention, and FIG. 4 illustrates a proxy-certificate-issuance-request message (ProxyReq_LLM) 400 according to an exemplary embodiment of the present invention.

Referring to FIG. 3, the delegation of the authority to issue a license may be performed using a bearer-proxy method which is part of a delegation-by-certificate scheme disclosed in RFC 3820, entitled "Internet X. 509 Public Key Infrastructure (PKI) Proxy Certificate Profile."

Specifically, the LLM 310 generates a proxy secret key SK_Proxy and a proxy public key PK_Proxy which are necessary for generating and verifying a proxy signature.

The LLM 310 may generate the proxy-certificate-issuance-request message 400. Referring to FIG. 4, the proxy-certificate-issuance-request message 400 may include subject information regarding the identity of the LLM 310 and the proxy public key PK_Proxy, and specify a set of rules regarding the generation of a proxy for license issuance (for example, the term of validity, the number of licenses, and an entity to which a license is to be issued). The proxy-certificate-issuance-request message 400 may include a signature SIG_Proxy (402), which is obtained using the proxy public key PK_Proxy and the proxy secret key SK_Proxy, in order to announce that the LLM 310 has the proxy secret key SK_Proxy corresponding to the proxy public key PK_Proxy.

The content of the proxy-certificate-issuance-request message 400 may be signed with the secret key SK_LLM of the LLM 310. The LLM 310 transmits the proxy-certificate-issuance-request message 400 to which a signature SIG_LLM (404) is attached to the local server 300 (S301).

Thereafter, the local server 300 verifies the proxy-certificate-issuance-request message 400 transmitted by the LLM 310 (S311). Specifically, the local server 300 verifies the signature SIG_LLM (404) using a public key PK_LLM of the LLM 310, and then verifies the signature SIG_Proxy (402) using the proxy public key PK_Proxy included in the proxy-certificate-issuance-request message 400.

Figure 5:
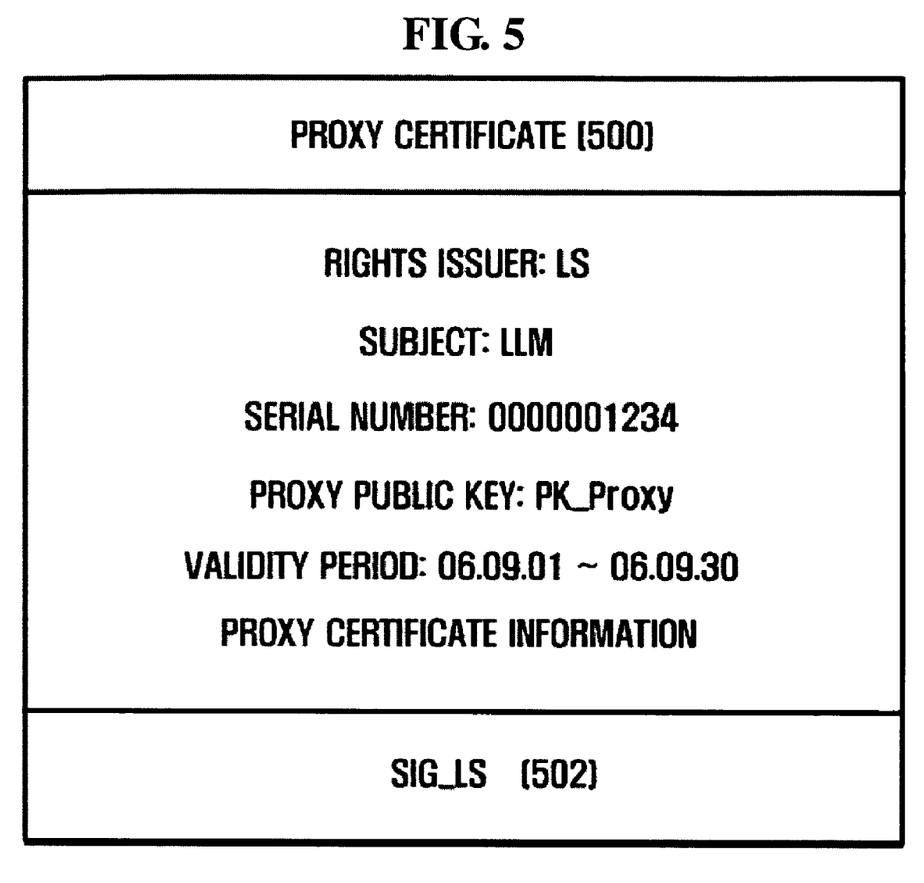
FIG. 5 illustrates a proxy certificate according to an exemplary embodiment of the present invention.

If the proxy-certificate-issuance-request message 400 is valid, the local server 300 binds the subject information regarding the identity of the LLM and the proxy public key PK_Proxy together, and generates a proxy certificate (Cert_Proxy) 500 for delegating the authority to issue a license to a number of devices. The proxy certificate 500 is illustrated in FIG. 5. Referring to FIG. 5, the proxy certificate 500 includes rights issuer information regarding the identity of the local server 300, subject information regarding the identity of the LLM 310, serial number information regarding the serial number of the proxy certificate 500, the proxy public key PK_Proxy, validity period information regarding the term of validity of the proxy certificate 500, and proxy certificate information (ProxyCertInfo). The proxy certificate information may include detailed information regarding the delegation of the authority to issue a license to the LLM 310 by a rights issuer. For example, the proxy certificate 500 may include information regarding the number of times a license has been issued and information regarding whether the authority to issue a license can be delegated again, and all the information included in the proxy certificate 500 may be read by a predetermined module in the LLM 310.

The authority delegated to the LLM 310 and restrictions regarding the authority delegated to the LLM 310 may be described using an XML-based description language, and may be included in a predetermined field ProxyCertInfo which is part of an extension field of the proxy certificate. Thereafter, the proxy certificate 500 is signed with a secret key SK_LS of the LS 300, and then a signature SIG_LS (502) is attached to the proxy certificate 500. Thereafter, the proxy certificate 500 is transmitted to the LLM 310 (S321).

Thereafter, the LLM 310 verifies the signature SIG_LS (502) of the proxy certificate 500 using a public key PK_LS of the LS 300 (S331). If the signature SIG_LS (502) of the proxy certificate 500 is valid, the LLM 310 may issue a license to a device within the authority prescribed in the proxy certificate 500 using the proxy secret key SK_Proxy.

When the LLM 310 purchases content on behalf of a device, the LS 300 issues to the LLM 310 a license that includes a content encryption key and that specifies the right to use the content and the term of validity of the content. The LLM 310 repackages the license issued thereto by the LS 300 using the authority delegated by the local server 300, i.e., using the proxy secret key SK_Proxy, and issues the repackaged license to a device so that the device can reproduce content using the repackaged license.

The proxy certificate 500 is revoked when its term of validity expires or when the number of times that a license has been issued exceeds a predefined value. In order to maintain the authority delegated by the local server 300, the LLM 310 must renew the proxy certificate 500 before the expiration of the term of validity of the proxy certificate 500. Even if the LLM 310 fails to renew the proxy certificate 500 before the expiration of the term of validity of the proxy certificate 500 due to a poor network connection or other factors, the proxy certificate 500 may be renewed later. The revocation and the renewal of the proxy certificate 500 may be performed automatically.

Figure 6:
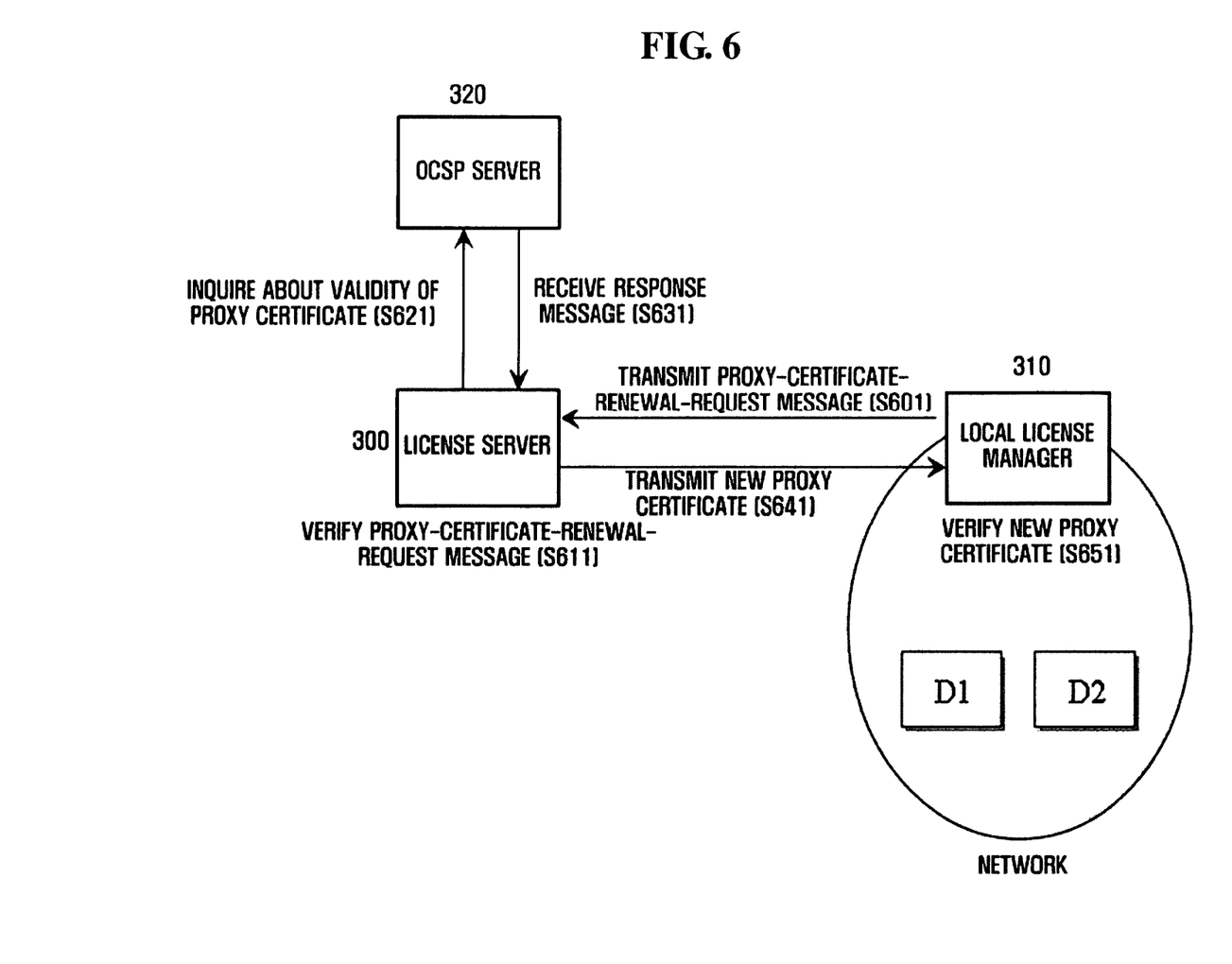
FIG. 6 illustrates a method of renewing a proxy certificate according to an exemplary embodiment of the present invention.
Figure 7:
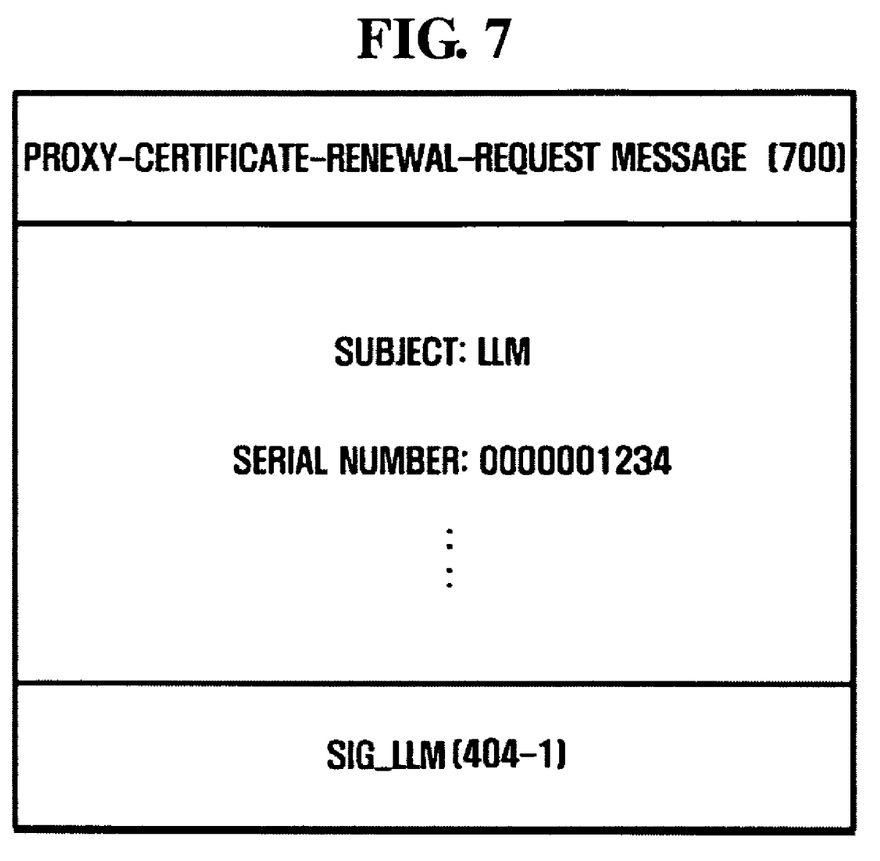
FIG. 7 illustrates a proxy-certificate-renewal-request message according to an exemplary embodiment of the present invention.

FIG. 6 illustrates a method of renewing a proxy certificate according to an exemplary embodiment of the present invention, and FIG. 7 illustrates a proxy-certificate-renewal-request message (ProxyRenewReq_LLM) 700. Referring to FIGS. 6 and 7, the LLM 310 generates the proxy-certificate-renewal-request message 700. The proxy-certificate-renewal-request message 700 may include subject information regarding the identity of the LLM 310 and serial number information regarding the serial number of the proxy certificate 500 illustrated in FIG. 5. The content of the proxy-certificate-renewal-request message 700 may be signed with the secret key SK_LLM of the LLM 310. Then, the proxy-certificate-renewal-request message 700 may be transmitted to the LS 300 along with the proxy certificate 500 (S601).

The LS 300 verifies the proxy-certificate-renewal-request message 700 (S611). That is, the LS 300 verifies a signature SIG_LLM (404-1) of the proxy-certificate-renewal-request message 700 using the public key PK_LLM of the LLM 310.

If the signature SIG_LLM (404-1) is valid, the LS 300 inquires of an Online Certificate Status Protocol (OCSP) server 320 whether the proxy certificate 500 is valid according to the OCSP using the serial number of the proxy certificate 500 (S621).

Then, the LS 300 receives the result of the inquiry from the OCSP server 320 (S631). The LS 300 may determine whether the proxy certificate 500 is valid with reference to a certificate revocation list (CRL) managed by the LS 300, instead of inquiring of the OCSP 320.

If the result of the inquiry indicates that the proxy certificate 500 is valid, the LS 300 generates a new proxy certificate by resetting the term of validity of the proxy certificate 500 or a maximum number of times that a license can be issued and signing the resulting proxy certificate 500 with the secret key SK_LS of the LS 300. Thereafter, the LS 300 transmits the new proxy certificate to the LLM 310 (S641).

The LLM 310 verifies a signature SIG_LS of the new proxy certificate transmitted by the LS 30 using the public key PK_LS of the LS 300 (S651). If the signature SIG_LS of the new proxy certificate is valid, the LLM 310 replaces the proxy certificate 500 with the new proxy certificate.

According to the method of the exemplary embodiment of FIG. 6, it is possible to improve the transparency of a system by increasing the term of validity of a proxy certificate without the need to change the proxy public key PK_Proxy. According to the method of the exemplary embodiment of FIG. 6, even if a new proxy certificate is issued, an existing proxy certificate may not be revoked until the term of validity of the existing proxy certificate expires. Thus, the existing proxy certificate and the new proxy certificate may coexist, but only temporarily. Therefore, the method of the exemplary embodiment of FIG. 6 does not cause any problems regarding the stability of a system.

In general, there is a tradeoff relationship between the stability of a system and the term of validity of a proxy certificate or the period of renewal of a proxy certificate. Thus, the term of validity of a proxy certificate or the period of renewal of a proxy certificate must be determined appropriately. If the term of validity of a proxy certificate is set short, an LLM may be effectively prevented from misusing or abusing the authority delegated by an LS, but the performance of a whole system may deteriorate due to the requirement of frequent renewals of a proxy certificate. The opposite may occur if the term of validity of a proxy certificate is set long. Therefore, if the performance of a system is prioritized over the stability of a system, the term of validity of a proxy certificate may be set relatively long. In contrast, if the stability of a system is prioritized over the performance of a system, the term of validity of a proxy certificate may be set relatively short. For example, the term of validity of a proxy certificate may be set to be one month given that the term of validity of a certificate is generally one year.

In the meantime, if there is the need to cancel the authority delegated to the LLM 310 by the LS 300 or if it is determined that the LLM 310 has misused or abused the authority delegated thereto by the LS 300, the LS 300 may register a proxy certificate issued to the LLM 310 by the LS 300 with the OCSP server 320 as a proxy certificate to be revoked (S100 of FIG. 8) by using a OCSP-based revoked certificate registration method. The registration of a revoked proxy certificate at the OCSP server 320 is well known to one of ordinary skill in the art to which the present invention pertains, and, thus, a detailed description has been omitted.

Figure 8:
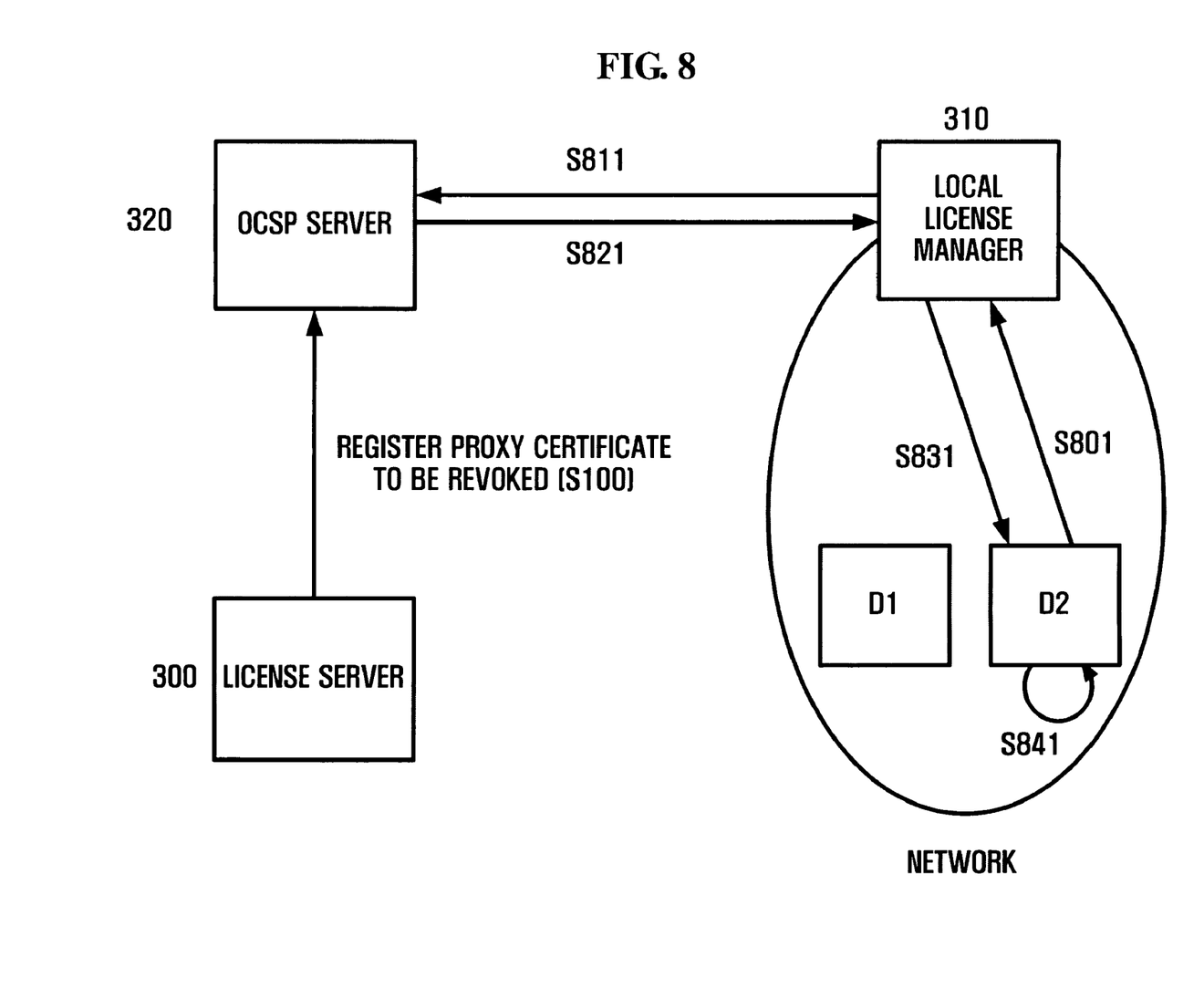
FIG. 8 illustrates a method of verifying a proxy certificate according to an exemplary embodiment of the present invention.

FIG. 8 illustrates a method of verifying a proxy certificate according to an exemplary embodiment of the present invention. Referring to FIG. 8, devices D1 and D2 require a license to reproduce content. The LLM 310 may issue a license with the authority delegated thereto. Thus, it is necessary to determine whether the authority delegated to the LLM 310 is valid before the reproduction of content. For this, the devices D1 and D2 may inquire of the OCSP server 320 whether a proxy certificate held by the LLM 310 is valid. However, not all the devices D1 and D2 may necessarily have the ability to communicate with the OCSP server 320. Thus, the devices D1 and D2 may determine whether the proxy certificate held by the LLM 310 is valid with the aid of the LLM 310. Since there is always a probability of the result of verification of the proxy certificate held by the LLM 310 being tampered by the LLM 310, the exemplary embodiment of FIG. 8 introduces compensatory measures as follows.

The device D2 generates a proxy-certificate-verification-request message, attaches a signature SIG_D2 of the device D2 to the proxy-certificate-verification-request message, and transmits the proxy-certificate-verification-request message to the LLM 310 (S801). The proxy-certificate-verification-request message includes a serial number of a predetermined proxy certificate and information such as a timestamp or nonce. The information such as a timestamp or nonce is used to prevent a replay attach against the proxy-certificate-verification-request message. The device D2 must safely store therein a pair of keys necessary for performing operation S801, i.e., a secret key SK_D2 and a public key PK_D2 of the device D2.

The LLM 310 transmits the proxy-certificate-verification-request message to the OCSP server 320 (S811).

The OCSP server 320 verifies the signature SIG_D2 of the device D2 using the public key PK_D2 of the device D2. If the signature SIG_D2 of the device D2 is valid, the OCSP server 320 verifies the predetermined proxy certificate. Then, the OCSP server 320 signs a response message regarding the result of the verification with a secret key SK_OCSP of the OCSP server 320, encrypts the response message with the public key PK_D2 of the device D2, and transmits the encrypted response message to the LLM 310 (S821).

The LLM 310 transmits the encrypted response message to the device D2 (S831).

The device D2 verifies a signature included in the encrypted response message using a public key PK_OCSP of the OCSP server 320. If the signature included in the encrypted response message is valid, the device D2 references the result of the verification performed by the OCSP server 320 (S841). If the result of the verification performed by the OCSP server 320 indicates that the predetermined proxy certificate is valid, the device D2 may readily reproduce content using a license corresponding to the predetermined proxy certificate. In contrast, if the result of the verification performed by the OCSP server 320 indicates that the predetermined proxy certificate is invalid, the device D2 may delete the predetermined proxy certificate and the license corresponding to the predetermined proxy certificate, notify a user that the license corresponding to the predetermined proxy certificate is invalid with the aid of a display device, and decide not to reproduce content.

According to the exemplary embodiment of FIG. 8, a request message and a response message transmitted between the OCSP server 320, the LLM 310, and the device D2 are all encrypted and have a signature attached thereto. Thus, it is possible to prevent the request message and the response message from being tampered by the LLM 310.

In addition, according to the exemplary embodiment of FIG. 8, even when the LLM 310 fails to properly verify a proxy certificate due to being under attack; it is possible to determine whether the proxy certificate is valid by determining whether an appropriate response message is received from the LLM 310.

Figure 9:
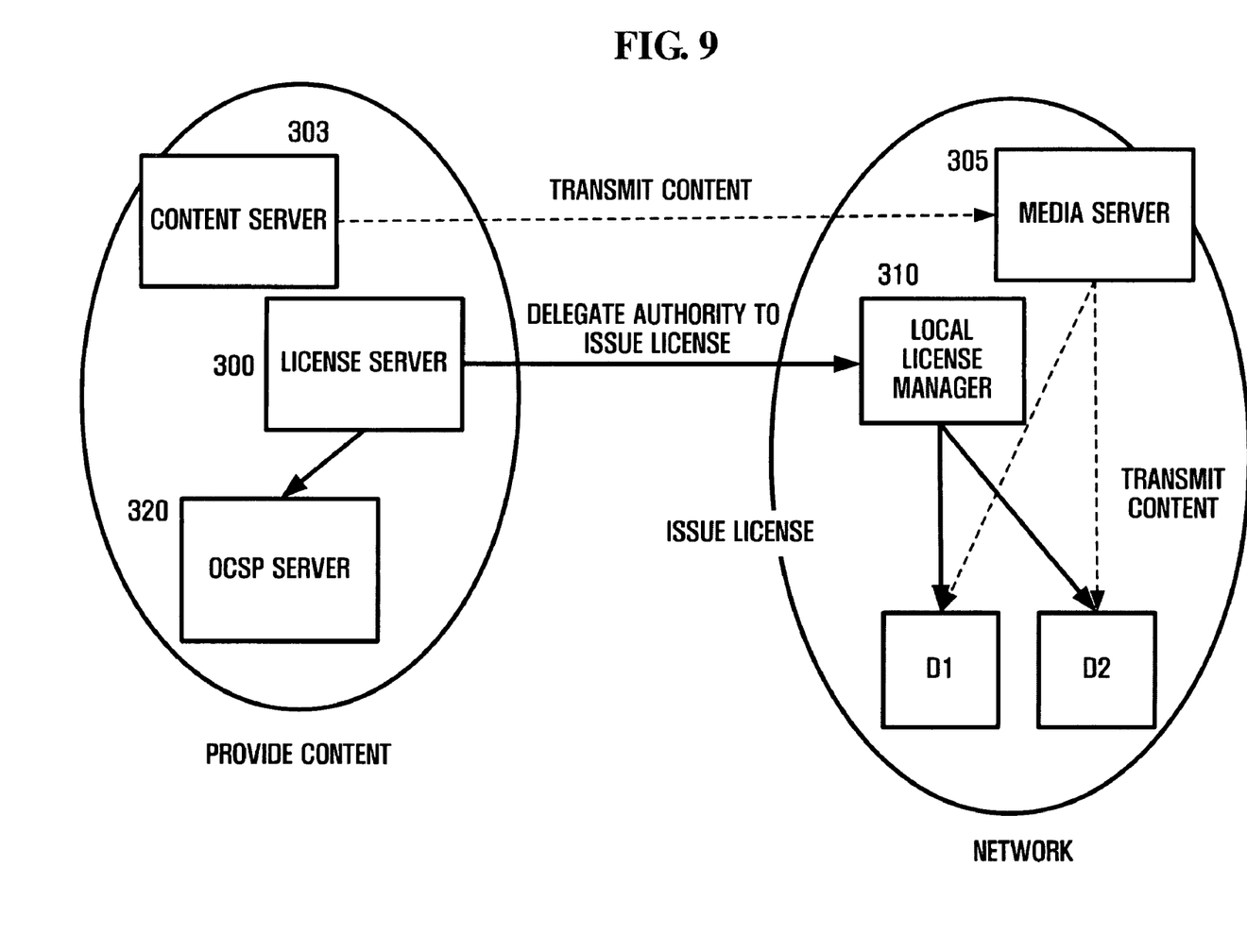
FIG. 9 is a block diagram of a license-management system according to an exemplary embodiment of the present invention.

FIG. 9 illustrates a license-management system according to an exemplary embodiment of the present invention. Referring to FIG. 9, the license-management system may include a content provider and a network. The content provider includes an LS 300 and a content server (CS) 303. The network includes an LLM 310, a local media server 305 (LMS), and an OCSP server 320.

The CS 303 distributes content, and is operated by the content provider who holds the intellectual property rights. The LS 300 may issue a license that specifies a legitimate right to use content to a content purchaser. The CS 303 and the LS 300 are illustrated in FIG. 9 as being separate. However, the CS 303 and the LS 300 may be incorporated into a single device. That is, the LS 300 may serve not only its functions but also the functions of the CS 303.

The CS 303 may safely package content and transmit the safely-packaged content to the LMS 305. For example, the CS 303 may encrypt content using a DRM method and transmit the encrypted content to the LMS 305.

The LS 300 generates a license which authorizes access to content legitimately purchased by a device according to the conditions of the purchase of the content. The license generated by the LS 300 describes how to consume the content.

According to the exemplary embodiment of FIG. 8, the devices D1 and D2 may readily reproduce content from a network by acquiring a license from the LLM 310 which manages a domain to which the devices D1 and D2 belong, instead of acquiring a license from the LS 300.

That is, the LLM 310 is delegated the authority to issue a license by the LS 300.

The OCSP server 320 responds to an inquiry about the validity of a certificate or a proxy certificate. A signature of the OCSP server 320 may be attached to a response message transmitted by the OCSP server 320.

Each device has a pair of keys: a secret key SK and a public key. Also, each individual device may include a certificate issued by a certificate authority (CA) for verifying a public key of a corresponding individual device. In order for two individual devices to communicate, Public Key Infrastructure (PKI)-based mutual authentication may be performed. A user device may be controlled by a reliable agent which can reproduce content within the authority prescribed in a legitimate license.

Figure 10:
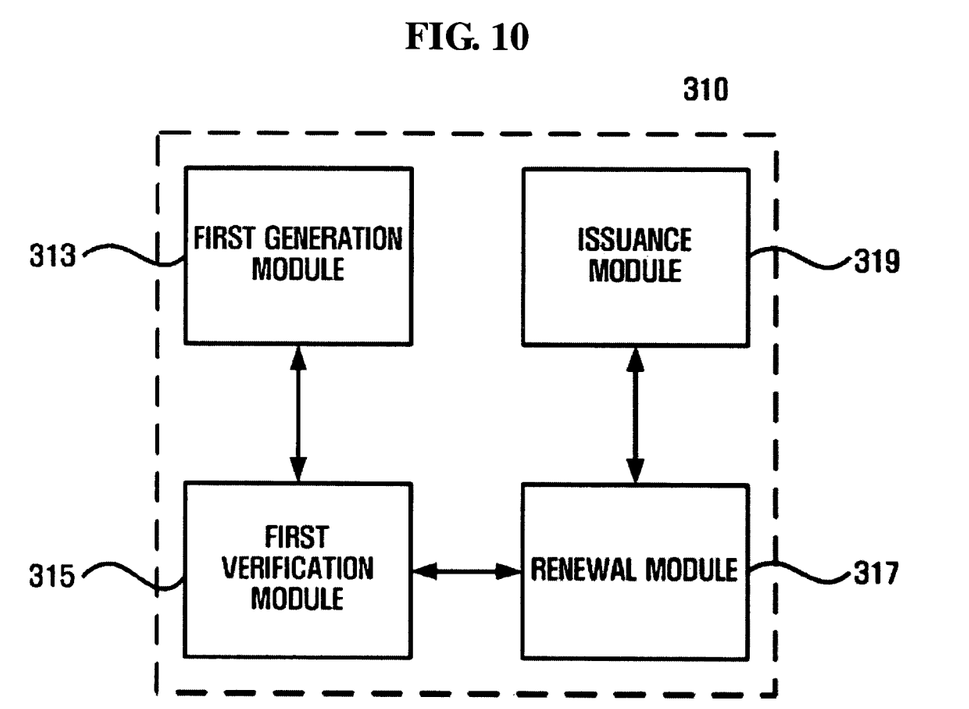
FIG. 10 is a block diagram of a local license manager (LLM) according to an exemplary embodiment of the present invention.

FIG. 10 is a block diagram of an LLM 310 according to an exemplary embodiment of the present invention. Referring to FIG. 10, the LLM 310 includes a first generation module 313, a first verification module 315, a renewal module 317 and an issuance module 319.

The first generation module 313 generates a proxy-certificate-issuance-request message including information regarding the authority to issue a license. That is, the LLM 310 may acquire the authority to issue a license from an LS using a proxy certificate. The first generation module 313 may generate a proxy secret key SK_Proxy and a proxy public key PK_Proxy which are necessary to generate and verify a proxy certificate. The proxy-certificate-issuance-request message may include a signature SIG_Proxy which are obtained using the proxy public key PK_Proxy and the proxy secret key SK_Proxy. The first generation module 313 may generate a proxy-certificate-renewal-request message. The proxy-certificate-renewal-request message may include subject information regarding the identity of the LLM 310 and serial number information regarding the serial number of a proxy certificate to be renewed. The proxy-certificate-renewal-request message may be signed with a secret key SK_LLM of the LLM 310. Then, the proxy-certificate-renewal-request message may be transmitted to an LS along with the proxy certificate to be renewed.

When a first proxy certificate is received from an LS, the first verification module 315 verifies the first proxy certificate. Specifically, the first verification module 315 may verify a signature SIG_LS of the first proxy certificate using a public key PK_LS of the LS. If the signature SIG_LS of the first proxy certificate is valid, the issuance module 319 may issue a license to a device within the authority prescribed in the first proxy certificate using the proxy secret key SK_Proxy. Thereafter, if a second proxy certificate is received from the LS, the first verification module 315 may verify a signature SIG_LS of the second proxy certificate using the public key PK_LS of the LS, and replace the first proxy certificate with the second proxy certificate if the signature SIG_LS of the second proxy certificate is valid.

The renewal module 317 replaces an existing proxy certificate with a new proxy certificate upon receiving the new proxy certificate from an LS. If the term of validity of the existing proxy certificate is yet to expire, the renewal module 317 may control the existing proxy certificate to be automatically revoked upon the expiration of the term of validity of the existing proxy certificate so that the existing proxy certificate can be replaced with the new proxy certificate.

The issuance module 319 issues a license for the use of content to a device within the authority prescribed in the proxy certificate.

Figure 11:
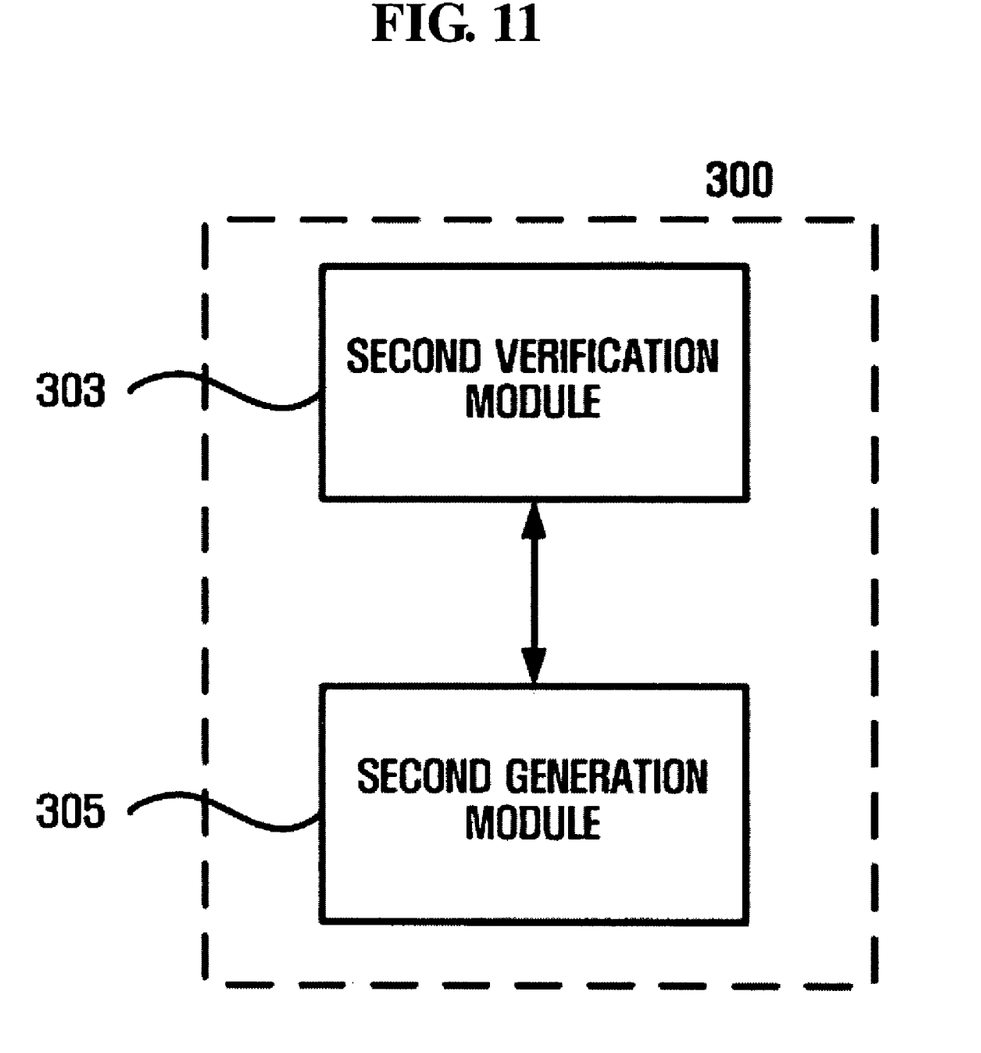
FIG. 11 is a block diagram of a license server (LS) according to another exemplary embodiment of the present invention.

FIG. 11 is a block diagram of an LS 300 according to an exemplary embodiment of the present invention. Referring to FIG. 11, the LS 300 includes a second verification module 303 and a second generation module 305.

The second verification module 303 verifies the proxy-certificate-issuance-request message transmitted by an LLM in order for the LLM to acquire the authority to issue a license. Specifically, the second verification module 303 may verify a signature SIG_LLM of the proxy-certificate-issuance-request message using a public key PK_LLM of the LLM. Thereafter, the second verification module 303 may verify a signature SIG_Proxy of the proxy-certificate-issuance-request message using a proxy public key PK_Proxy included in the proxy-certificate-issuance-request message. Also, the second verification module 303 may verify a proxy-certificate-renewal-request message transmitted by the LLM. Specifically, the second verification module 303 may verify a signature SIG_LLM of the proxy-certificate-renewal-request message using the public key PK_LLM of the LLM. Then, if the proxy-certificate-renewal-request message is valid, the second verification module 303 may inquire of an OCSP server whether a proxy certificate to be renewed is valid, and receive a response message regarding the result of verification of the proxy certificate to be renewed from the OCSP server.

If a proxy-certificate-issuance-request message or a proxy-certificate-renewal-request message received from an LLM is valid, the second generation module 305 generates a proxy certificate including information regarding the authority to issue a license. Specifically, the second generation module 305 may generate a proxy certificate by binding the subject information regarding the identity of the LLM and the proxy public key PK_Proxy together. The proxy certificate generated by the second generation module 305 may include at least one of rights issuer information regarding the identity of the LS 300, serial number information regarding the serial number of the corresponding proxy certificate, the proxy public key PK_Proxy, validity period information regarding the term of validity of the corresponding proxy certificate, and proxy certificate information. The proxy certificate generated by the second generation module 305 may be signed with a secret key SK_LS of the LS 300, and then a signature SIG_LS is attached to the proxy certificate signed with the secret key SK_LS. Thereafter, the proxy certificate with the signature SIG_LS attached thereto may be transmitted to an LLM. Also, if a response message indicating that a proxy certificate to be renewed is valid is received from an OCSP server (not shown), the second generation module 305 may generate a new proxy certificate and transmit the new proxy certificate to an LLM. The new proxy certificate may include at least one of validity period information regarding the term of validity of the new proxy certificate and information regarding a maximum number of times that a license can be issued. The new proxy certificate may be signed with the secret key SK_LS of the LS 300.

Figure 12:
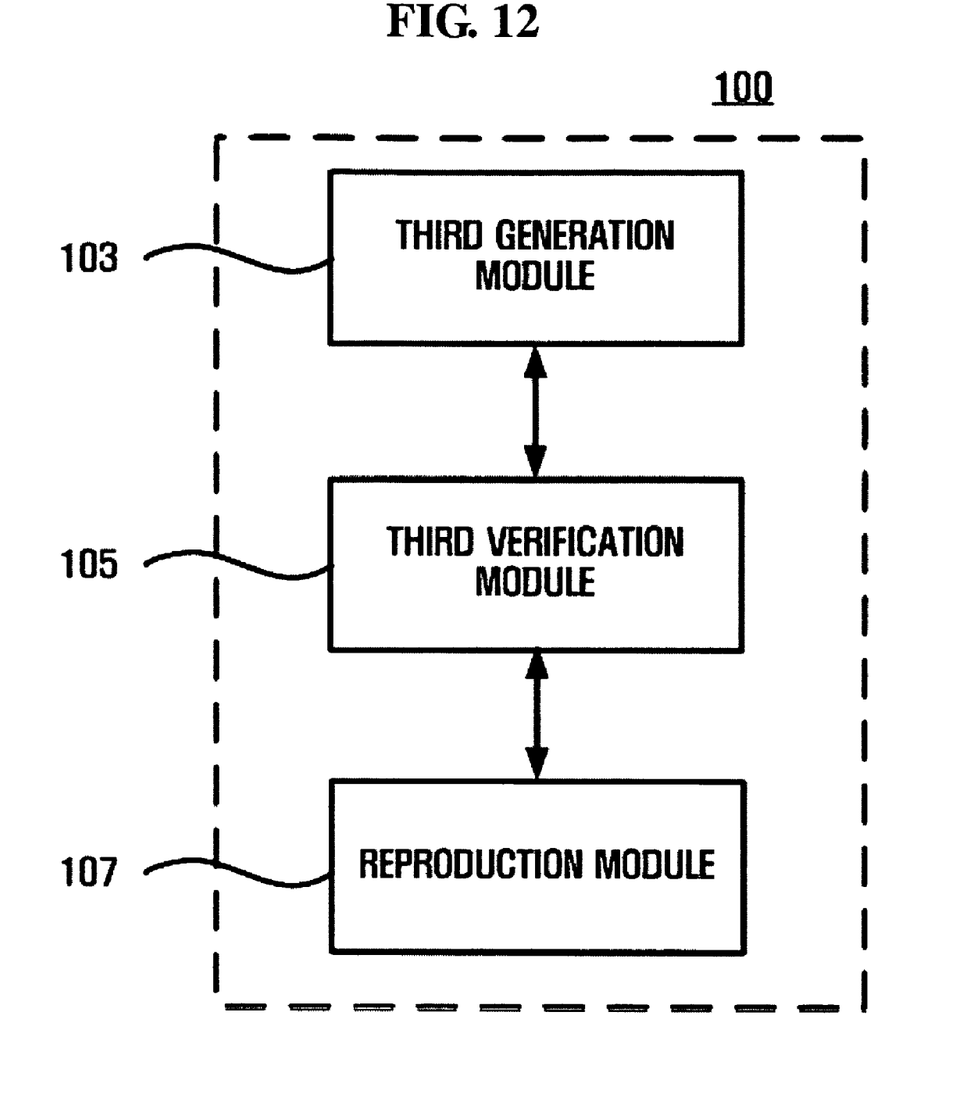
FIG. 12 is a block diagram of an apparatus for verifying a proxy certificate according to an exemplary embodiment of the present invention.

FIG. 12 is a block diagram of an apparatus 100 (hereinafter referred to as the proxy certificate verification apparatus 100) for verifying a proxy certificate according to an exemplary embodiment of the present invention. Referring to FIG. 12, the proxy certificate verification apparatus 100 includes a third generation module 103, a third verification module 105, and a reproduction module 107. The proxy certificate verification apparatus 100 may be embodied in, for example, the device D2.

The third generation module 103 generates a proxy-certificate-verification-request message including the serial number of a proxy certificate held by an LLM and other information such as a timestamp and nonce, encrypts the proxy-certificate-verification-request message with the public key PK_D2 of the device D2. The information such as a timestamp and nonce may be used to prevent a replay attack against the proxy-certificate-verification-request message.

The third verification module 105 verifies a signature of a response message received from the OCSP server (not shown) using a public key PK_OCSP of the OCSP server. If the signature of the response message is valid, the third verification module 105 may reference the result of verification performed by the OCSP server. If the result of the verification performed by the OCSP server indicates that a proxy certificate held by an LLM is valid, the reproduction module 107 may reproduce content using a license issued by the LLM. In contrast, if the result of the verification performed by the OCSP server indicates that a proxy certificate held by an LLM is invalid, the reproduction module 107 may delete the proxy certificate held by the LLM and the license issued by the LLM.

The term "module", as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of issuing a proxy certificate, comprising:
transmitting a proxy-certificate-issuance-request message to a license server by a local license manager;
verifying the proxy-certificate-issuance-request message by the license server;
if the proxy-certificate-issuance-request message is valid as a result of the verification, transmitting a proxy certificate to the local license manager by the license server, the proxy certificate comprising information regarding an authority to issue a license; and verifying the proxy certificate by the local license manager; and
if the proxy-certificate-issuance request message is invalid as a result of the verification, deleting the proxy certificate.

2. The method of claim 1, wherein the verifying the proxy-certificate- issuance-request message comprises verifying a signature included in the proxy-certificate- issuance-request message using a public key of the local license manager by the license server.

3. The method of claim 1, further comprising issuing the license by the local license manager for use of content to a device within the authority prescribed in the proxy certificate.

4. A method of renewing a proxy certificate, comprising:
transmitting a proxy-certificate-renewal-request message to a license server by a local license manager, the proxy-certificate-renewal-request message comprising information regarding an authority to issue a license;
verifying the proxy-certificate-renewal-request message by the license server;
if the proxy-certificate-renewal-request message is valid, inquiring an Online Certificate Status Protocol (OCSP) server by the license server whether an existing proxy certificate held by the local license manager is valid; and
if a response message indicating that the existing proxy certificate is valid is received from the OCSP server, transmitting a new proxy certificate to the local license manager by the license server.

5. The method of claim 4, further comprising verifying the new proxy certificate by the local license manager using a public key of the license server.

6. The method of claim 4, wherein the new proxy certificate comprises at least one of information regarding a term of validity of the new proxy certificate and information regarding a maximum number of times the license can be issued.

7. The method of claim 4, further comprising readily replacing the existing proxy certificate with the new proxy certificate or automatically revoking the existing proxy certificate upon expiration of the term of validity of the existing proxy certificate.

8. A method of verifying a proxy certificate, comprising:
transmitting a proxy-certificate-verification-request message to a local license manager by a device;
transmitting the proxy-certificate-verification-request message to an Online Certificate Status Protocol (OCSP) server by the local license manager;
transmitting a response message indicating the result of verification of the proxy certificate to the local license manager by the OCSP server; and
transmitting the response message to the device by the local license manager;
wherein if no response message is received from the OCSP server within a predefined amount of time, determining that the proxy certificate is invalid and deleting a license issued by the local license manager and the proxy certificate by the device.

9. The method of claim 8, further comprising encrypting the proxy- certificate-verification-request message with a public key of the device and to attach a signature of the device to the encrypted proxy certificate by the device.

10. The method of claim 8, further comprising verifying the proxy- certificate-verification-request message using a public key of the device by the OCSP server.

11. The method of claim 8, further comprising signing the response message with a secret key of the OCSP server and encrypting the signed response message with a public key of the device by the OCSP server.

12. A method of verifying a proxy certificate, comprising:
transmitting a proxy-certificate-verification-request message to a local license manager by a device;
transmitting the proxy-certificate-verification-request message to an Online Certificate Status Protocol (OCSP) server by the local license manager;
transmitting a response message indicating the result of verification of the proxy certificate to the local license manager by the OCSP server;
transmitting the response message to the device by the local license manager; and
if the response message indicates that the proxy certificate is invalid, deleting at least one of a license issued by the local license manager and the proxy certificate by the device.

13. A license server comprising:
a verification module which receives at least one of a first request message for requesting a proxy certificate comprising information regarding an authority to issue a license and a second request message for requesting a proxy certificate to be renewed from a local license manager and verifies the first or second request message; and
a generation module which generates at least one of a first proxy certificate if the first request message is valid and a second proxy certificate if the second request message is valid;
wherein the verification module inquires of an Online Certificate Status Protocol (OCSP) server whether the first proxy certificate is valid if the second request message is valid, and the generation module generates the second proxy certificate if a response message indicating that the first proxy certificate is valid is received from the OCSP server.

14. The license server of claim 13, wherein the first proxy certificate or the second proxy certificate comprises rights issuer information, subject information, serial number information regarding a serial number of the first proxy certificate or the second proxy certificate, a proxy public key, validity period information and proxy certificate information.

15. The license server of claim 13, wherein the generation module resets at least one of a term of validity of the first proxy certificate and a maximum number of times that the license can be issued, and then generates the second proxy certificate.

* * * * *